United States Patent [19]

Martino

[11] Patent Number: 4,487,859

[45] Date of Patent: Dec. 11, 1984

[54] SELF-CURING WATER DISPERSED POLYMERS

[75] Inventor: Phillip C. Martino, Brunswick, Ohio

[73] Assignee: SCM Corporation, New York, N.Y.

[21] Appl. No.: 553,557

[22] Filed: Nov. 21, 1983

[51] Int. Cl.$^3$ .................. C08F 20/56; C08F 30/02; C09D 3/74; C09D 5/02

[52] U.S. Cl. .................. 523/406; 106/14.12; 523/100; 524/807; 526/274; 526/277; 526/278

[58] Field of Search .................. 523/406, 100; 106/14.12; 524/807; 526/274, 277, 278

[56] References Cited

U.S. PATENT DOCUMENTS

| | | | |
|---|---|---|---|
| 3,419,642 | 12/1968 | McGary et al. | 526/277 |
| 4,014,838 | 3/1977 | Kraft et al. | 524/807 |
| 4,044,044 | 8/1977 | Saito | 526/277 |
| 4,066,597 | 1/1978 | Jäger | 524/807 |
| 4,071,508 | 1/1978 | Steckler | 526/277 |
| 4,169,086 | 9/1979 | Nölken | 526/193 |
| 4,181,783 | 1/1980 | Chattha | 525/162 |
| 4,181,784 | 1/1980 | Chattha et al. | 525/163 |
| 4,181,785 | 1/1980 | Chattha et al. | 525/162 |
| 4,237,241 | 12/1980 | Chattha | 525/162 |

FOREIGN PATENT DOCUMENTS

| | | | |
|---|---|---|---|
| 57-87869 | 6/1982 | Japan | 106/14.12 |
| 58-47070 | 3/1983 | Japan | 526/277 |
| 958856 | 5/1964 | United Kingdom | 526/277 |
| 1577923 | 10/1980 | United Kingdom | 106/14.12 |

*Primary Examiner*—Ronald W. Griffin
*Attorney, Agent, or Firm*—Thomas M. Schmitz

[57] ABSTRACT

A self-curing water dispersed emulsion or solution polymerized polymer comprises copolymerizing ethylenically unsaturated monomers including (i) alkylol acrylamide monomer, (ii) functional monomer such as carboxyl, hydroxyl, amine, or amide functional monomer, (iii) phosphated monomer, and (iv) other ethylenically unsaturated monomer.

12 Claims, No Drawings

SELF-CURING WATER DISPERSED POLYMERS

BACKGROUND OF THE INVENTION

This invention pertains to corrosion resistant water dispersed polymers, and more particularly to phosphorus containing emulsion or solution polymerized polymers suitable for use as paint binder in protective surface coating systems.

Latex polymer systems containing phosphorus additives are suggested in U.S. Pat. No. 4,169,086 where the use of organic phosphates and phosphonates are suggested as buffers in a latex polymerization. Phosphated monomers are disclosed in U.S. Pat. No. 3,686,371 as well as the Journal of Polymer Science, Vol. 1, pages 3343–3356 (1963). Water based coating compostions for use as an interior coating for metal containers are suggested in U.S. Pat. No. 3,991,216 wherein the polymer comprises an interpolymer of polymerized acrylamide monomer, carboxylic monomers and other ethylenically unsaturated monomers. Commonly assigned copending application Ser. No. 468,364 filed Feb. 22, 1983 discloses a self-curing water dispersed emulsion polymerized polymer containing both alkyl acrylamide monomer and reactive functional monomer in combination with an epoxy-acrylic copolymer and a phosphated polymer. Other prior art patents such as U.S. Pat. No. 4,237,241, U.S. Pat. No. 4,181,784 and U.S. Pat. No. 4,181,785 suggest that cross linking reactions between polymers containing hydroxyl functionality and amine type crosslinkers are catalyzed by certain hydroxy organophosphate esters.

It now has been found that an emulsion polymerized polymer containing copolymerized phosphoric monomer in combination with an alkylol acrylamide monomer provides a substantially improved self-curing phosphate containing polymer exhibiting improved corrosion resistance and similar desirable film integrity properties. In accordance with this invention, an hydroxy phosphate monomer is first prepared from glycol or epoxy resin which in turn is emulsion or solution copolymerized with alkylol acrylamide monomer, functional monomer, and other monomers to produce the self-curing phosphate polymer. The copolymerized hydroxy phosphate is adapted to internally crosslink with the functional monomer and may further function as a catalyst for subsequent crosslinking with an external crosslinker such as melamine. Inclusion of the hydroxy phosphate ester monomer promotes reaction between polymeric hydroxyl groups and crosslinkers, and may also participate in these crosslinking reactions through the hydroxyl functionality adjacent to the phosphate ester. Improved crosslinking efficiency and improved incorporation of polymer catalyst and crosslinker into the crosslinked network is thereby achieved. Less external crosslinker is required to provide high molecular weight cured films, which can be achieved at much lower curing temperatures. Thus, advantages of this invention include improved crosslinking efficiency resulting in sufficient cure at reduced levels of copolymerized and external crosslinkers as well as lower bake temperatures. These and other advantages of this invention will become more apparent by referring to the detailed description and illustrative examples set forth hereinafter.

SUMMARY OF THE INVENTION

Briefly, the self-curing emulsion or solution polymerized polymer of this invention comprises a copolymer containing copolymerized ethylenically unsaturated monomers including between 1 and 20% alkylol acrylamide monomer, between 1 and 15% functional monomer, between 0.1 and 10% phosphated monomer with the balance being other ethylenically unsaturated monomer.

DETAILED DESCRIPTION OF THE INVENTION

In accordance with this invention, certain reactive self-curing water dispersed phosphated polymers comprise copolymerized ethylenically unsaturated monomers comprising (i) alkylol acrylamide and preferably alkylated alklyol acrylamide monomer, (ii) functional monomers selected from reactive carboxy, hydroxy, amine or amide monomers, (iii) phosphated monomer, and (iv) other ethylenically unsaturated monomer.

The alkylated alkylol acrylalmide monomers can be derivatives of acrylamide, methacrylamide, methylol acrylamide, or similar alkyl modified alkylol acrylamide monomers, as shown for example in U.S. Pat. Nos. 3,991,216; and 4,097,438; and 4,305,859. The alkylol acrylamide monomers preferably are etherified with an alkyl group such as methyl, ethyl, propyl, n-butyl, or iso-butyl, and similar alkylated alkylol acrylamide monomers, wherein the butylated monomers are preferred.

Functional monomers include carboxyl, hydroxyl, amino, and amido functional group containing monomers. Carboxy containing monomers include acrylic acid and lower alkyl substituted acrylic acids wherein the preferred carboxylic monomers are acrylic and methacrylic acids. Hydroxyl containing monomers are hydroxy containing ethylenically unsaturated monomers including hydroxyl alkyyl acrylates such as 2-hydroxy ethyl acrylate and methacrylate, 2-hydroxypropyl acrylate and methacrylate, and similar hydroxy alkyl acrylates. Amido containing monomers include acrylamide and methacrylamide or similar alkyl alkylol acrylamide monomers. Reactive monomers further include N-methylol acrylamide or methacrylamide monomers.

Phosphate monomers include hydroxy alkyl phosphate ester monomer containing at least one unsaturated double bond. The hydroxy alkyl phosphate ester monomer can be prepared, for instance, by reacting an acrylic glycol with phosphorous pentoxide or reacting an acrylic monoepoxide with superphosphoric acid to produce an hydroxy acrylic phosphate ester monomer. The mixture of ethylenic monomers in accordance with this invention can contain by weight between 0.1% and 10% hydroxy alkyl phosphate ester monomer. The phosphated monomer can further comprise a phosphoric acid ester of an hydroxy alkyl acrylate or methacrylate, or other hydroxyl containing ethylenically unsaturated monomers. Phosphated monomers of this type include for example, phosphated esters of 2-hydroxyethyl methacrylate, 2-hydroxyethyl acrylate, similar hydroxyalkyl acrylates or methacrylates, and allyl alcohols. The phosphated monomer can be a monoester such as mono-hydroxyethyl methacrylate or a diester such as di-hydroxyethyl methacrylate. Monophosphoric acid esters of acrylic or methacrylic acid provide mono-ethylenically unsaturated phosphated monomers. Phosphated monomers can be prepared as shown in U.S. Pat. No. 3,636,371 and the same is incorporated herein by reference. Preferred phosphated monomers are produced by phosphating a monomer prepared by reacting glycol or epoxy resin with an acrylic acid derivative such as acrylic or methacrylic acid.

The remaining monomers that can be copolymerized with the alkylol acrylamide monomer, functional monomers, and phosphated monomer to form a reactive self-curing polymer are ethylenically unsaturated monomers such as vinyl monomers, including for example, vinyl esters such as vinyl acetate, vinyl propionate, vinyl butyrates, vinyl benzoate, isopropenyl acetate and similar vinyl esters; and vinyl halides such as vinyl chloride. Other ethylenically unsaturated monomers can include, for example, those monomeric materials exhibiting ethylenic double bond unsaturation such as polymerizable allylic, acrylic, fumaric, maleic or like ethlenically unsaturated double bond functionality. Further ethylenically unsaturated monomers can include, for example styrene, methyl styrenes and similar alkyl styrenes, chlorostyrene, vinyl toluene, vinyl naphthalene, divinyl benzene, diallyl phthalate and similar diallyl derivatives, butadiene, alkyl esters of acrylic and methacrylic acid and similar ethylenically unsaturated monomers. Further suitable ethylenically unsaturated monomers include acrylic unsaturated monomers such as lower alkyl esters of acrylic or methacryic acid having an alkyl ester portion containing between 1 and 12 carbon atoms as well as aromatic derivatives of acrylic and methacrylic acid, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate benzyl acrylate and methacrylate and various reaction products such as butyl, phenyl, and cresyl glycidyl ethers reacted with acrylic and methacrylic acids, hydroxyl alkyl acrylates and methacrylates such as hydroxyethyl and hydroxypropyl acrylates and methacrylates, as well as amino acrylates and methacrylates.

The self-curing water dispersed polymer can be synthesized by conventional one-step copolymerization or by step-wise polymerization of monomers in water whereby the alkylol acrylamide monomers are polymerized in the second polymerization step. In step-wise polymerizations monomers can be proportioned on a weight basis from 25/75 to 75/25 first stage/second stage monomers. The reactive self-curing water dispersed polymer preferably is a copolymer prepared by copolymerizing the ethylenically unsaturated monomers in water by two step polymerization through free radical induced polymerization using peroxy or azo catalysts, common redox catalyst, ultraviolet radiation or the like. Free radical initiators include various peroxygen compounds such as persulfates, benzoyl peroxide, t-butyl hydroperoxide, cumene hydroperoxide, and similar peroxide catalysts; and azo compounds such as azo bis-isobutyronitrile and dimethylazobisisobutyrate. Initiating systems further include alkali metal persulfate or ammonium persulfate with or without a reducing substance adapted to activate the persulfate. The initiators or catalysts ordinarily are used at a level of about 0.1% to 1% by weight of monomers. The resulting self-curing water dispersed polymer contains by weight between 1% and 20% reactive carboxyl, hydroxyl, amine or amide monomer, and the remaining being other ethylenically unsaturated monomers. Suitable water dispersed polymers can be produced by various polymerization techniques such as emulsion or solution polymerization. Monomers are emulsion polymerized in water using a water soluble initiator in the presence of emulsifier. Solution polymerization is conducted in organic solvent and usually employs an organic peroxide initiator.

The self-curing water dispersed phosphated polymer of this invention contains by weight between 1% and 20% alkylol acrylamide monomer, 1% and 20% functional monomer, 0.10% and 10% phosphated monomer, and the balance being other ethylenically unsaturated monomer. In a two step polymerization, the first stage can contain monomer from each of the foregoing classifications although the alkylol acrylamide monomer is most preferably contained only in the second stage monomers. The first stage monomers comprise between about 25% and 75% of the total polymerized monomers. The second stage monomers can contain monomers in the first stage plus the alkylol acrylamide derivative monomer. Preferably the monomer composition of the two stages should be similar except for the preferred inclusion of alkylol acrylamide monomer in the second stage to insure compatibility between the two monomer stages and avoid unnecessary agglomeration during synthesis.

In a two step polymerization, monomer stages are sequentially emulsion copolymerized during 6-8 hours at 70°-80° C. utilizing standard semi-continuous methodology. Monomer conversion is routinely about 99.8% and the final nonvolatile content is usually 45–55%. Polymer particle size is determined by the level of primary surfactant in the initial reactor charge. The preferred polymer particle size range is 2000–4000Å. However, this range can be exceeded to meet certain application requirements since particle size has been found to have little effect upon coatings performance. Polymer Tg is also important to application characteristics, and should range between about 0° C. and 70° C.

A highly desirable sprayable coating composition can be produced based on the reactive self-curing water dispersed polymer as the binder system in the coating. Coating compositions can be based on the self-curing water dispersed phosphated polymer as the matrix polymer. The foregoing matrix polymer compositions can be mixed with a water-dispersable crosslinking component generally referred to as aminoplast resins adapted to heat cure and crosslink with the carboxyl functionality of epoxy-acrylic copolymer mixture. On a polymer weight basis, the coating composition contains between 0% and 15% aminoplast crosslinking resin mixed with between 85% and 100% of the above indicated matrix polymer mixtures.

For spraying, the coating composition preferably contains between about 10% and 30% by weight polymeric solids relative to 70% and 90% water including other volatiles such as minor amounts of organic solvent. For applications other than spraying, the aqueous polymeric dispersions can contain between about 10% and 40% by weight water. Organic solvents utilized to facilitate spray or other application methods include n-butanol, 2-butoxy-ethanol-1, xylene, toluene. A solvent combination preferably to spray application is n-butanol and 2-butoxy-ethanol-1. The coating composition of the present invention can be pigmented and/or opacified with known pigments and opacifiers. For many uses, including food uses, the preferred pigment is titanium dioxide. The resulting aqueous coating composition can be applied satisfactorily by conventional methods known in the coating industry. Thus, spraying, rolling, dipping, and flow coating application methods can be used for both clear and pigmented films, although spraying is preferred. After application onto the metal substrate, the coating is cured thermally at temperatures in the range from about 95° C. to about 235° C. or higher for time being sufficient to effect complete curing as well as volatilizing of any fugitive component therein. Upon heat curing, the reactive self-curing water dispersed copolymer is believed to become reactive whereby the alkyl group etherified to the alkylol acrylamide splits off as alcohol and is volatilized. The acrylamide portion of the polymer chain then reacts with functional carboxyl, hydroxyl, or amido groups, or can react with an aminoplast crosslinking resin if present.

For a better understanding of the present invention, the following examples are provided. In this application, all parts are parts by weight, all percentages are weight percentages, and temperatures are degrees Centigrade unless otherwise expressly noted.

EXAMPLE 1

Thermosetting Copolymers Containing Phosphate Functionality

Monomers containing phosphate functionality were prepared by the reaction of phosphorus pentoxide with hydroxyl ethyl acrylate using the method disclosed in U.S. Pat. No. 3,686,371. In this method, 140 parts of phosphorus pentoxide were added slowly to a vigorously stirred solution of 350 parts hydroxyl ethyl acrylate and 0.05 parts MEHQ inhibitor. Reaction temperature was maintained at 25°-35° with external cooling. After addition of phosphorus pentoxide was complete, the reaction was stirred for 2.5 hours at 30° C. and then heated for two hours at 45° to insure complete reaction. Both mono and diesters were present in the reaction mixture but did not require separation prior to polymerization.

Phosphate monomers can be emulsion or solution copolymerized using standard semi-continuous methodology. Solution polymerization is best accomplished in a 1:2 mixture of butoxy-ethanol and n-butanol. Emulsion polymerization can proceed in aqueous media without the preserve of additional organic solvents.

A thermosetting emulsion copolymer containing phosphate monomer was prepared by loading 110 parts deionized water and 0.10 parts sodium dihexyl sulfosuccinate into the reactor. The solution was heated under nitrogen sparge to 76°-78° C. At equilibrated reaction temperature, the nitrogen sparge was removed and 0.10 parts ammonium bicarbonate added. A mixture of 1.2 parts styrene and 0.80 parts ethyl acrylate was then added to the reactor and emulsified 10 minutes whereupon 0.30 parts ammonium persulfate were added and allowed to react 20 minutes before beginning the monomer feed.

The monomer mix contained 35.5 parts styrene, 50.0 parts ethyl acrylate, 4.0 parts methacrylic acid, 10.0 parts N-isobutoxy methyl acrylamide, and 0.50 parts 2-phosphate ethyl methacrylate. Monomers were added to the reactor at constant rate during 4.5-5.0 hours while maintaining the reaction temperature at 76°-78° C. The batch was then held an additional two hours at reaction temperature, during which time an additional 400 parts deionzed water was added to reduce viscosity.

EXAMPLE 2

Thermosetting Copolymers Containing Hydroxy Phosphate Funtionality

Monomers containing hydroxy phosphate functionality were prepared by reaction of superphosphoric acid with epoxide monomers by an adaptation of the method disclosed in U.S. Pat. No. 3,487,130. In this method, 142 parts of glycidyl methacrylate were added slowly to a vigorously stirred solution of 105 parts superphosphoric acid in 250 parts butoxy-ethanol at 0° C. After addition of epoxide monomer was complete, the reaction was warmed to room temperature and stirred an additional two hours. Undesirable free phosphoric acid can be removed from the crude product by aqueous extraction with saturated sodium chloride solution.

A thermosetting solution copolymer containing hydroxy-phosphate monomer was prepared by loading 258 parts butoxy-ethanol and 602 parts butanol into the reactor, and heated them under nitrogen sparge to 120° C. At equilibriated reaction temperature, the nitrogen sparge was removed, and a mixture of 980 parts styrene, 900 parts ethyl acrylate, 100 parts methacrylic acid, and 20 parts hydroxyphosphate monomer in butoxy-ethanol prepared as described above, and 26 parts benzoyl peroxide were added to the reactor at a constant rate over four hours while maintaining the reaction temperature at 120°-122° C. The batch was then held an additional six hours at 115° C., during which time additional benzoyl peroxide was added to complete monomer conversion.

The foregoing emulsion and solution copolymers produced in Examples 1 and 2 were formulated to produce excellent interior can coatings.

I claim:

1. A water dispersed coating composition containing a polymeric binder, the binder polymer comprising copolymerized ethylenically unsaturated monomers and on polymeric solids weight basis:
   copolymerized monomers comprising between 1% and 20% alkylated alkylol acrylamide monomer, between 1% and 15% functional monomer selected from reactive carboxyl, hydroxyl, amine, or amide functional group monomer, and between 0.1% and 10% phosphate monomer, with the balance being other ethylenically unsaturated monomer.

2. The coating composition in claim 1 wherein the phosphated monomer comprises an hydroxy alkyl phosphate ester monomer.

3. The coating composition in claim 1 wherein the phosphated monomer is a phosphoric acid ester of an hydroxyl acrylate or methacrylate.

4. The coating composition in claim 1 wherein the phosphated monomer is a phosphate ester of allyl alcohol.

5. The coating composition in claim 1 wherein the phosphated monomer is prepared by reacting an acrylic acid derivative with a glycol to produce a glycol ester monomer, and then phosphating the glycol ester monomer with a phosphoric acid derivative to produce a phosphated monomer.

6. The composition in claim 1 wherein the phosphated monomer is prepared by reacting an arcylic acid derivative with epoxy resin to produce an epoxy ester monomer, and then phosphating the epoxy ester monomer with a phosphoric acid derivative to produce a phosphated monomer.

7. In a process for copolymerizing ethylenically unsaturated monomer, the improvement comprising:
   copolymerizing on a weight basis between 1% and 20% alkylated alkylol acrylamide monomer, between 1% and 15% functionally reactive monomer containing reactive functional group selected from carboxyl, hydroxyl, amine, or amide functional groups, between 0.1% and 10% phosphate monomer, and the balance being other ethylenically unsaturated monomer.

8. The process in claim 7 wherein the phosphated monomer comprises an hydroxy alkyl phosphate ester monomer.

9. The process in claim 7 wherein the phosphated monomer is a phosphoric acid ester of an hydroxyl alkyl acrylate or methacrylate.

10. The process in claim 7 wherein the phosphated monomer is a phosphate ester of allyl alcohol.

11. The process in claim 7 wherein the process includes the step of first preparing the phosphated monomer by reacting an acrylic acid derivative with a glycol to produce a glycol ester monomer and phosphating the glycol ester monomer with a phosphoric acid derivative to produce phosphated monomer.

12. The process in claim 7 wherein the process includes the step of first preparing the phosphated monomer by reacting an acrylic acid derivative with an epoxy resin to produce an epoxy step of first preparing the phosphated monomer by reacting an acrylic acid derivative with an epoxy resin to produce an epoxy ester monomer, and then phosphating the epoxy ester monomer with a phosphoric acid derivative to produce a phosphated monomer.

* * * * *